No. 694,421. Patented Mar. 4, 1902.
J. G. RIDINGS.
RIDING SPUR.
(Application filed Sept. 16, 1901.)
(No Model.)
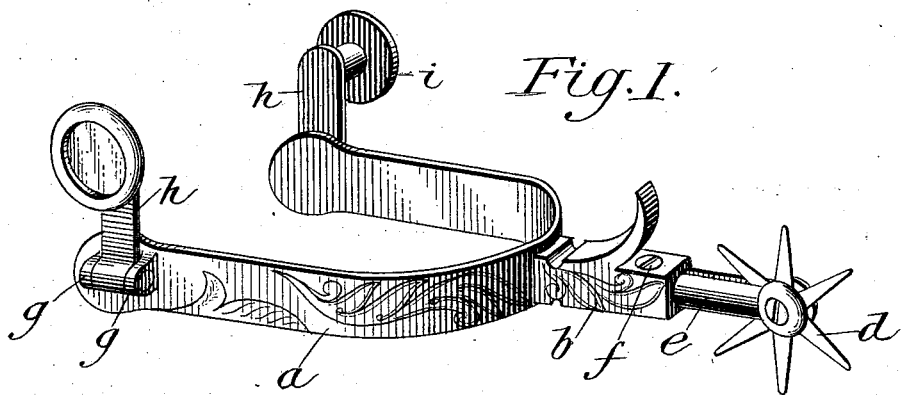
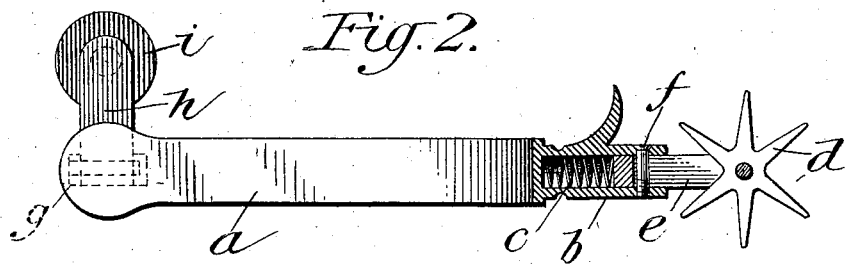
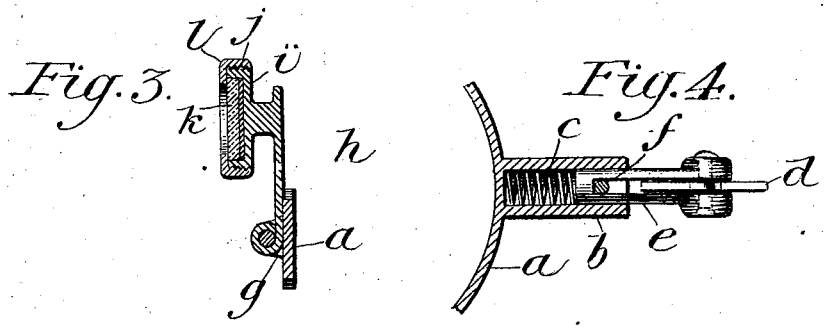
Witnesses:
D. W. Edelin
J. E. Hutchinson Jr.
Inventor:
J. G. Ridings
By his attys
Pennie & Goldsborough
THE NORRIS PETERS CO., PHOTO-LITHO., WASHINGTON, D. C.

UNITED STATES PATENT OFFICE.

JOHN G. RIDINGS, OF AMARILLO, TEXAS.

RIDING-SPUR.

SPECIFICATION forming part of Letters Patent No. 694,421, dated March 4, 1902.

Application filed September 16, 1901. Serial No. 75,483. (No model.)

*To all whom it may concern:*

Be it known that I, JOHN G. RIDINGS, a citizen of the United States, residing at Amarillo, county of Potter, and State of Texas, have invented certain new and useful Improvements in Riding-Spurs; and I do hereby declare the following to be a full, clear, and exact description of the invention, such as will enable others skilled in the art to which it appertains to make and use the same.

The invention relates to riding-spurs for horsemen, and has for its object to provide a spur of neat and attractive appearance, light in weight, and of simple and durable construction.

It consist generally of a heel-band of the usual form, having a socket at its rear end. The rowel of the spur is loosely journaled in the arms of a shank, which is secured in the socket, so as to be free to slide in and out thereof. A spring is inclosed in the socket and reacts between it and the end of the shank, thereby serving to normally hold the shank and rowel in an extended position, but permitting the shank to slide within the socket against the tension of the spring when the spur is thrust against the sides of the animal. The extent of movement of the shank in the socket is such that when it is forced inward the tines or points of the rowel engage with the rear end of the socket, thereby locking the rowel against further rotation.

The invention is illustrated in the accompanying drawings, in which—

Figure 1 is a perspective view of my improved spur. Fig. 2 is a longitudinal vertical section of the same. Fig. 3 is a transverse sectional view through one of the buttons or studs; and Fig. 4 is a longitudinal horizontal section through the spur, a portion of the heel-band being cut away.

Referring to these drawings, *a* is a heel-band of any suitable material and of the usual construction, having integrally formed therewith at the rear a socket or housing *b*, preferably closed at one end by a portion of the band *a*, which forms a seat for a coiled spring *c*, inclosed within said housing. The outer end of the housing is open and receives one end of a rowel-shank *e*, the said shank carrying at its opposite end a rowel *d*. The rowel *d* may be of any desired configuration and is freely journaled in the arms of the shank *e*, which projects into the housing *b* and engages with the spring *c*, so that the expansive force of the spring is exerted against it and normally projects the shank from the housing. To prevent entire displacement of the rowel and its shank from the housing by reason of the force exerted by the spring, a screw-bolt *f* is inserted into the outer end of the housing and passes through the bifurcated portion of the shank, which permits the said shank to be projected only so far as the slot formed by the bifurcated end extends. The rowel is normally free to rotate upon its axis; but when the shank is retracted by reason of the rider thrusting the spur into the sides of the animal the points of the rowel will engage the sides of the socket and securely lock the rowel against further rotation so long as the rowel and its shank are held in this position. By this means the rowel is locked automatically and no preadjusting or setting of any locking device is necessary before using the spur.

The front ends of the heel-band are each preferably provided upon their outer sides and considerably below the top edge of the same with lugs *g*, made integral therewith. To these lugs are hinged swinging ears *h*, carrying at their opposite ends the strap buttons or studs *i*. The placing of the lugs in this position, so that the hinge will be located below the top edge of the heel-band, is desirable, as the sides of the heel-band afford a brace or support for the swinging ears, and thus take the strain off the hinge. They also prevent the buttons from pressing inward on the ankles when the spurs are strapped tight.

Formed upon the upper ends of the swinging arms *h* are the studs or buttons *i*, to which the straps for fastening the spur to the foot are intended to be attached. For the purpose of giving the spur an ornamental appearance these buttons are constructed as follows for the purpose of carrying a photograph or other appropriate picture: At the upper ends of the arms *h* are formed cup-shaped disks or circular heads, that are recessed to form receptacles for the picture and its securing means, consisting of a glass covering-plate $k$ and a threaded ring $l$, which is screwed onto the outer threaded edge $j$ of the disk, so as to hold the glass and picture firmly in place.

What I claim as my invention is—

A riding-spur comprising a heel-band, an open-ended socket projecting from the rear thereof, a shank having a limited sliding movement in said socket, a rowel freely journaled at the outer end of the shank, and a spring inclosed within the socket and serving to hold the shank normally outward, the tines or points of the rowel being adapted to engage the socket and secure the rowel against rotation when the shank is pressed inward.

In testimony whereof I affix my signature in presence of two witnesses.

JOHN G. RIDINGS.

Witnesses:
W. S. MADDREY,
R. S. WARE.